United States Patent
Dominguez, III et al.

(10) Patent No.: US 12,478,906 B2
(45) Date of Patent: Nov. 25, 2025

(54) FILTER ASSEMBLY FOR PACKAGING SYSTEMS

(71) Applicant: Formers International, Inc., Pasadena, TX (US)

(72) Inventors: John Dominguez, III, Pasadena, TX (US); Andrew Harrison Struthers, Houston, TX (US)

(73) Assignee: Formers International, Inc., Pasadena, TX (US)

( * ) Notice: Subject to any disclaimer, the term of this patent is extended or adjusted under 35 U.S.C. 154(b) by 529 days.

(21) Appl. No.: 17/941,555

(22) Filed: Sep. 9, 2022

(65) Prior Publication Data
US 2024/0082767 A1    Mar. 14, 2024

(51) Int. Cl.
*B01D 46/00* (2022.01)
*B65B 55/24* (2006.01)

(52) U.S. Cl.
CPC .......... *B01D 46/0005* (2013.01); *B65B 55/24* (2013.01); *B01D 2265/023* (2013.01); *B01D 2265/028* (2013.01); *B01D 2271/027* (2013.01)

(58) Field of Classification Search
CPC .......... B65B 9/20; B65B 37/02; B65B 55/24; B65D 55/24; B65D 1/28; B65D 25/001; B01D 46/0002; B01D 46/0005; B01D 46/2403; B01D 2265/027; B01D 2265/023; B01D 2265/028; B01D 2271/027; F16B 37/0885; F16B 2/00–2/25; F16B 7/00–7/0043; F16L 3/1075; F16L 3/221; F16L 3/082

USPC ...... 55/385.1, 502, 505, 506, 510, 504, 529, 55/493; 141/10, 11, 69, 93, 286, 331; 426/392
See application file for complete search history.

(56) References Cited

U.S. PATENT DOCUMENTS

| | | | | |
|---|---|---|---|---|
| 3,287,886 A | * | 11/1966 | Tiberi | B28C 7/0076 55/378 |
| 4,074,507 A | * | 2/1978 | Ruf | B65B 1/34 53/502 |
| 4,318,431 A | * | 3/1982 | Evans | B65B 3/32 141/90 |
| 4,418,513 A | * | 12/1983 | Plahm | B65B 31/042 53/481 |
| 4,532,754 A | | 8/1985 | Hokanson | |
| 4,711,068 A | | 12/1987 | Dominguez | |
| 4,766,716 A | | 8/1988 | Dominguez | |
| 5,052,451 A | * | 10/1991 | Gentilcore | B65B 1/28 55/374 |
| 5,169,524 A | * | 12/1992 | Meiritz | B01D 29/96 55/497 |
| 5,195,298 A | * | 3/1993 | Baranowski | B65B 55/24 53/425 |

(Continued)

*Primary Examiner* — Duane Smith
(74) *Attorney, Agent, or Firm* — Patterson + Sheridan, LLP

(57) ABSTRACT

An assembly having a first body coupled to a second body via a hinged connection to rotatably couple the first and second bodies together. The assembly also has a releasable connection releasably coupling the first and second bodies together. The assembly also has a filter coupled to at least one of the first and second bodies and configured to prevent solids from flowing through the filter while allowing fluid flow through the filter. The assembly is configured to be coupled to a dispensing pipe of a dosing device and a fill pipe of a packaging system.

20 Claims, 9 Drawing Sheets

(56) References Cited

U.S. PATENT DOCUMENTS

| | | | | |
|---|---|---|---|---|
| 5,740,844 A * | 4/1998 | Miller | B65B 39/00 | |
| | | | 141/90 | |
| 5,746,795 A * | 5/1998 | Witter | B01D 45/16 | |
| | | | 55/459.3 | |
| 6,253,811 B1 * | 7/2001 | Slagh | B65B 39/004 | |
| | | | 141/386 | |
| 6,840,782 B1 * | 1/2005 | Borden | H01R 4/643 | |
| | | | 439/92 | |
| 7,041,217 B1 * | 5/2006 | Close | B01D 29/111 | |
| | | | 210/232 | |
| 7,056,364 B2 * | 6/2006 | Wang | B01D 46/2414 | |
| | | | 55/498 | |
| 7,575,617 B2 * | 8/2009 | Ferguson | F24F 13/085 | |
| | | | 55/DIG. 32 | |
| 9,004,545 B2 * | 4/2015 | Whitaker | F16L 19/0218 | |
| | | | 285/419 | |
| 10,711,929 B1 * | 7/2020 | Lu | F16L 37/082 | |
| 10,761,286 B2 * | 9/2020 | Janssens | F16B 2/185 | |
| 11,629,804 B1 * | 4/2023 | Morano, III | F16L 23/04 | |
| | | | 285/24 | |
| 2003/0167740 A1 * | 9/2003 | Murphy | B01D 46/02 | |
| | | | 96/267 | |
| 2006/0026937 A1 * | 2/2006 | Nichols | B01D 46/62 | |
| | | | 55/486 | |
| 2009/0084727 A1 * | 4/2009 | Yonezawa | F16K 11/07 | |
| | | | 210/495 | |
| 2009/0208277 A1 * | 8/2009 | Werth | F16L 23/04 | |
| | | | 403/312 | |
| 2010/0327576 A1 * | 12/2010 | Linhorst | F16L 23/06 | |
| | | | 285/38 | |
| 2012/0174548 A1 * | 7/2012 | Konzelmann | B01D 29/055 | |
| | | | 210/232 | |
| 2012/0219354 A1 * | 8/2012 | Bauer | F16B 2/12 | |
| | | | 403/187 | |
| 2012/0227221 A1 * | 9/2012 | Whitaker | F16L 19/025 | |
| | | | 29/525.08 | |
| 2013/0212842 A1 * | 8/2013 | Rigollet | F16L 23/08 | |
| | | | 24/461 | |
| 2015/0323563 A1 * | 11/2015 | Todd, II | G01R 1/04 | |
| | | | 24/484 | |
| 2017/0248258 A1 * | 8/2017 | Kuo | F16B 2/10 | |
| 2017/0321726 A1 * | 11/2017 | Lane | F16B 2/185 | |
| 2019/0249803 A1 * | 8/2019 | Franklin | F16L 3/1075 | |
| 2019/0315502 A1 | 10/2019 | Bierschenk et al. | | |
| 2019/0383431 A1 * | 12/2019 | Magagna | F16B 2/185 | |
| 2020/0048969 A1 * | 2/2020 | Aas | F16B 7/0413 | |
| 2020/0080675 A1 * | 3/2020 | White | F16L 23/04 | |
| 2020/0129893 A1 * | 4/2020 | Kuan | F16B 7/22 | |
| 2021/0310584 A1 * | 10/2021 | Koehler | F16L 23/08 | |
| 2021/0348708 A1 * | 11/2021 | Farr | E03C 1/1222 | |
| 2023/0213048 A1 * | 7/2023 | Andersen | F16B 2/065 | |
| | | | 29/402.01 | |
| 2024/0082767 A1 * | 3/2024 | Dominguez, III | B65B 55/24 | |
| 2024/0229992 A1 * | 7/2024 | Garcia | F16L 23/10 | |
| 2024/0318754 A1 * | 9/2024 | Magagna | F16L 3/1075 | |

* cited by examiner

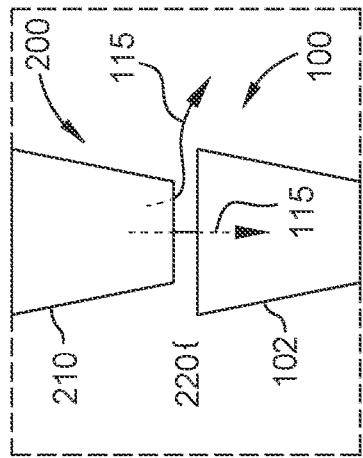
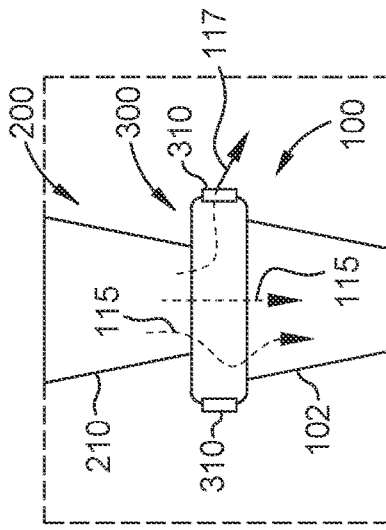
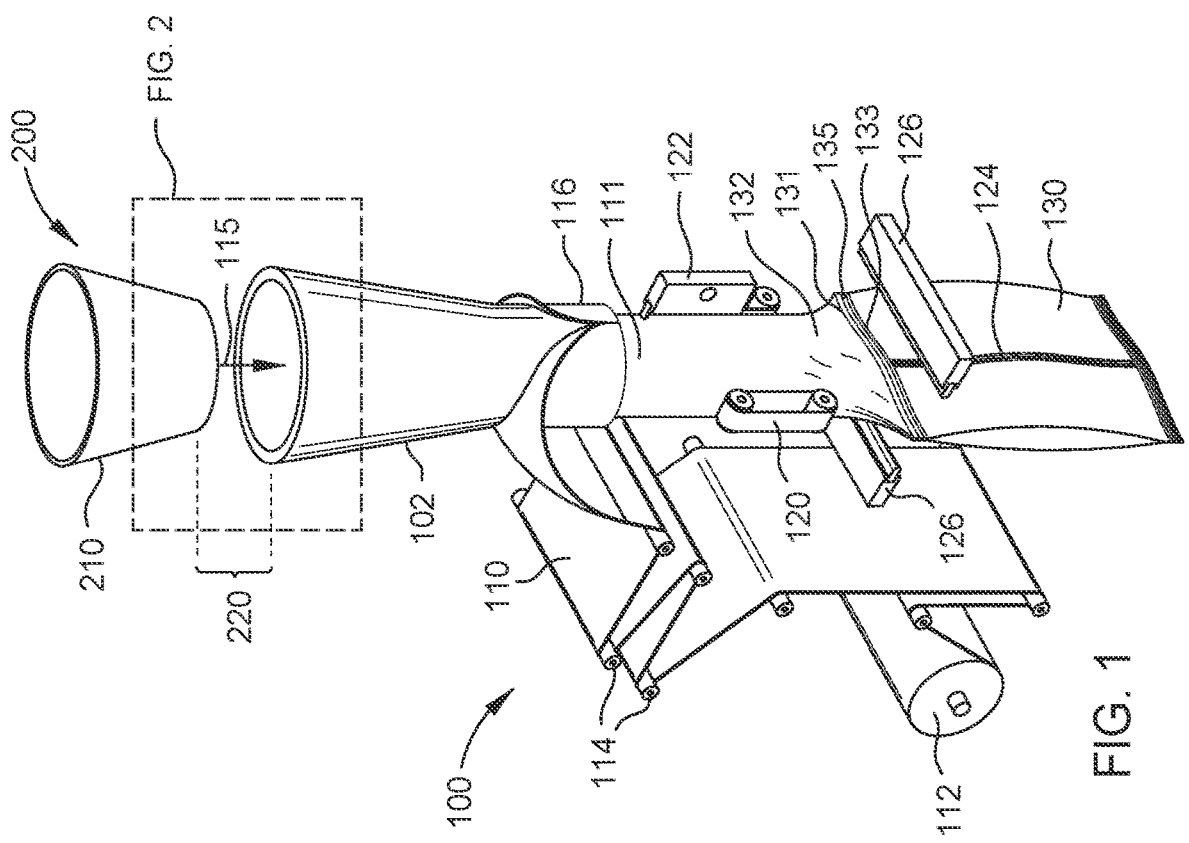

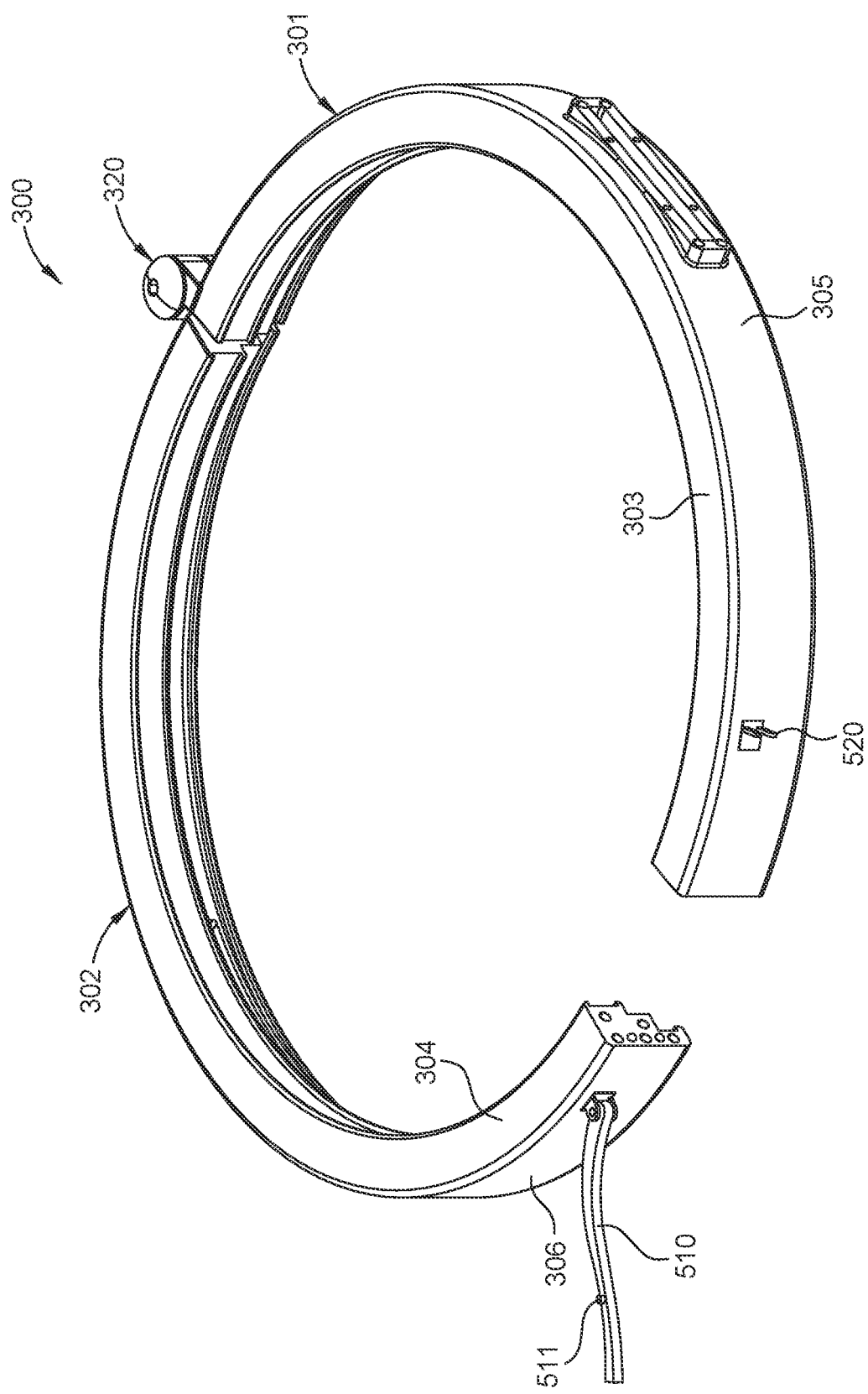

FILTER ASSEMBLY FOR PACKAGING SYSTEMS

BACKGROUND

Field

Embodiments of the present disclosure generally relate to a packaging system, and specifically a filter assembly for use with the packaging system to help control product flow during a package forming process.

Description of the Related Art

Packaging systems of the vertical form-fill-seal class are commonly used for packaging various types of product, such as snack foods like chips. These types of packaging systems guide a web of flexible packaging material over a forming hood commonly known as a "former," where the flexible packaging material is formed into an open ended tubular configuration. The open ended tubular configuration is fed downward, sealed to form a longitudinal seam, filled with a product, and sealed at package length intervals, and cut into individual packages.

A fill pipe directs product into the package that is formed by the "former." A dosing device is located above the fill pipe for gravity feeding the product to be packaged into the fill pipe. Oftentimes the product or portions of the product flows out of the open space located between the dosing device and the fill pipe, and settles on the external surfaces of the packaging system and the surrounding work environment. Over time, buildup of the product can cause uncleanliness of the packaging system and the surrounding work environment, which require a high degree of sanitation.

Therefore, there is a need for new and/or improved apparatus and methods for controlling product flow during package forming processes.

SUMMARY

In one embodiment, a filter assembly comprises a first body having an opening formed through the first body; a second body; a hinged connection rotatably coupling the first and second bodies together; a releasable connection releasably coupling the first and second bodies together; and a filter coupled to the first body and that is in fluid communication with the opening formed through the first body, wherein the filter is configured to prevent solids from flowing through the filter while allowing fluid flow through the filter.

In one embodiment, a filter assembly comprises a first body having an opening formed through the first body; a second body rotatably coupled to the first body; an upper sealing member coupled to the first and second bodies and located above the opening formed through the first body; a lower sealing member coupled to the first and second bodies and located below the opening formed through the first body; and a filter coupled to the first body and that is in fluid communication with the opening formed through the first body, wherein the filter is configured to prevent solids from flowing through the filter while allowing fluid flow through the filter.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 1 is a perspective view of a portion of a packaging system and a portion of a dosing device, according to one embodiment.

FIG. 2 is a schematic view of a portion of a fill pipe of the packaging system and a portion of a dispensing pipe of the dosing device, according to one embodiment.

FIG. 3 is a schematic view of the fill pipe and the dispensing pipe illustrated in FIG. 2 but with a filter assembly coupled to the fill pipe and the dispensing pipe, according to one embodiment.

FIG. 7B is a top perspective view of the filter assembly with the latch in an open and unlocked position, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 4:
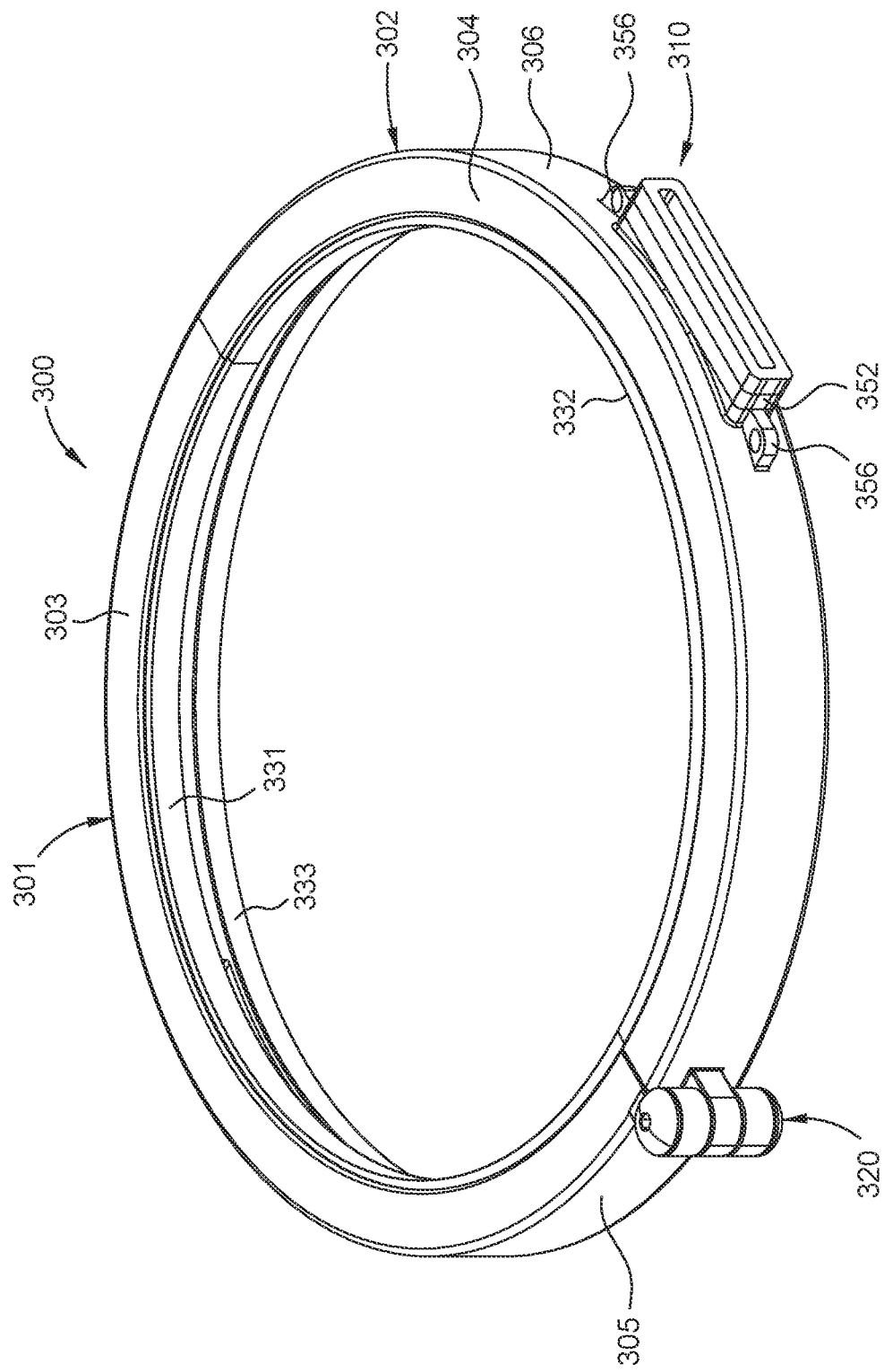
FIG. 4 is a top perspective view of a filter assembly, according to one embodiment.

The present disclosure generally relates to packaging systems configured to form packages, such as bags, which are filled with a product such as snack foods like chips. More specifically, the present disclosure relates to a filter assembly for use with packaging systems to help control the flow of product from a dosing device to a fill pipe of the packaging system. The filter assembly prevents the product or portions of the product from flowing out of an open space located between the dosing device and the fill pipe, which may buildup over time and cause contamination of the packaging system and the surrounding work environment. The filter assembly is configured to attach to various types and sizes of dosing devices and fill pipes of various packaging systems.

FIG. 1 illustrates a packaging system 100, and a dosing device 200 located above the packaging system 100. It is to be noted that only portions of the packaging system 100 and the dosing device 200 are illustrated in FIG. 1. The packaging system 100 may be a vertical form, fill and seal packaging system.

A flexible packaging material 110 is taken from a roll 112 and passed through a plurality of tensioners 114 that keep the flexible packaging material 110 taut. The flexible packaging material 110 is typically a packaging film such as polypropylene, polyester, paper, polyolefin extrusions, adhesive laminates, and other such materials, or from layered combinations of the above. For many food products, where flavor retention is important, a metalized layer will form the inner most layer of the flexible packaging material 110.

From the tensioners 114, the flexible packaging material 110 then passes over a former 116, which directs the flexible packaging material 110 into a vertical tube 111 around the lower end of a fill pipe 102. As the vertical tube 111 of the flexible packaging material 110 is pulled downward by drive belts 120, the vertical tube 111 is sealed along its length by a vertical sealer 122, forming a back seal 124. The packaging system 100 then applies a pair of sealing jaws 126 against the vertical tube 111 of the flexible packaging material 110 to form a transverse seal 135. The transverse seal 135 acts as a top seal 133 on a bag 130 formed below the pair of sealing jaws 126, and acts as a bottom seal 131 on a partially completed bag 132 formed above the pair of sealing jaws 126. After the transverse seal 135 has been formed, a cut is made across the sealed area to separate the finished bag 130 (which is located below the transverse seal 135) from the partially completed bag 132 above the transverse seal 135.

Before the pair of sealing jaws 126 form each subsequent transverse seal 135, a product 115 to be packaged is sent through the fill pipe 102 via gravity feeding and/or pumped with a compressed gas, and is held within the partially completed bag 132 above the bottom seal 131. Specifically, the product 115 is directed by the fill pipe 102 into the open upper end of the vertical tube 111 and falls into the partially completed bag 132. The vertical tube 111 of the flexible packaging material 110 is then pushed downward by the drive belts 120 to draw out another package length. The partially completed bag 132 is then entirely formed upon completion of the subsequent transverse seal 135 which forms top seal 133.

The product 115 is dispensed from the dosing device 200 located above the packaging system 100. Specifically, the product 115 is dispensed out of an open bottom end of a dispensing pipe 210 (only partially illustrated in FIG. 1) of the dosing device 200 and flows into an open upper end of the fill pipe 102. Gravity feeding and/or pumping with a compressed gas, such as nitrogen or air, help direct the product into the fill pipe 102 and into the vertical tube 111. The inner diameter of the open bottom end of the dispensing pipe 210 is less than the inner diameter of the upper end of the fill pipe 102 so that substantially all of the product 115 flows into the fill pipe 102. Although the bottom end of the dispensing pipe 210 is located as close as possible to the upper end of the fill pipe 102, due to the size and arrangement of the dosing device 200 and the packaging system 100, an open space 220, such as a gap, remains between the bottom end of the dispensing pipe 210 and the upper end of the fill pipe 102.

FIG. 2 is a schematic view of the upper end of the fill pipe 102 and the bottom end of the dispensing pipe 210 with the open space 220 located in-between, according to one embodiment. During a package forming process, the product 115 is directed via gravity feed and/or pumped with compressed gases from the dispensing pipe 210 of the dosing device 200 to the fill pipe 102 of the packaging system 100. However, some of the product 115 and/or portions of the product 115 may flow out through the open space 220 and into the surrounding work environment. The product 115 and/or portions of the product 115 that flow out through the open space 220 may settle on the exterior surfaces of the packaging system 100 and/or the surrounding work environment, which may buildup over time and cause contamination.

FIG. 3 is a schematic view of a filter assembly 300 having one or more filters 310 coupled to the upper end of the fill pipe 102 and the bottom end of the dispensing pipe 210, according to one embodiment. Specifically, the open space 220 illustrated in FIGS. 1 and 2 is now covered by the filter assembly 300. The filter assembly 300 is coupled to the outer diameters of the fill pipe 102 and the dispensing pipe 210. The filter assembly 300 however may be coupled to the outer and inner diameters, or only the inner diameters, of the fill pipe 102 and/or the dispensing pipe 210.

During a package forming process, the product 115 is directed via gravity feed and/or pumped with compressed gases from the dispensing pipe 210 of the dosing device 200 to the fill pipe 102 of the packaging system 100. The filters 310 of the filter assembly 300 prevent the product 115 and/or portions of the product 115 from flowing out into the surrounding work environment, while allowing fluid flow 117 (such as gases, e.g. air and/or nitrogen) through the filters 310. The filter assembly 300 helps contain the flow of product 115 from the dosing device 200 to the packaging system 100. The filter assembly 300 is configured to attach to various types and sizes of both dispensing pipes 210 of dosing devices 200 and fill pipes 102 of packaging systems 100.

Figure 5:
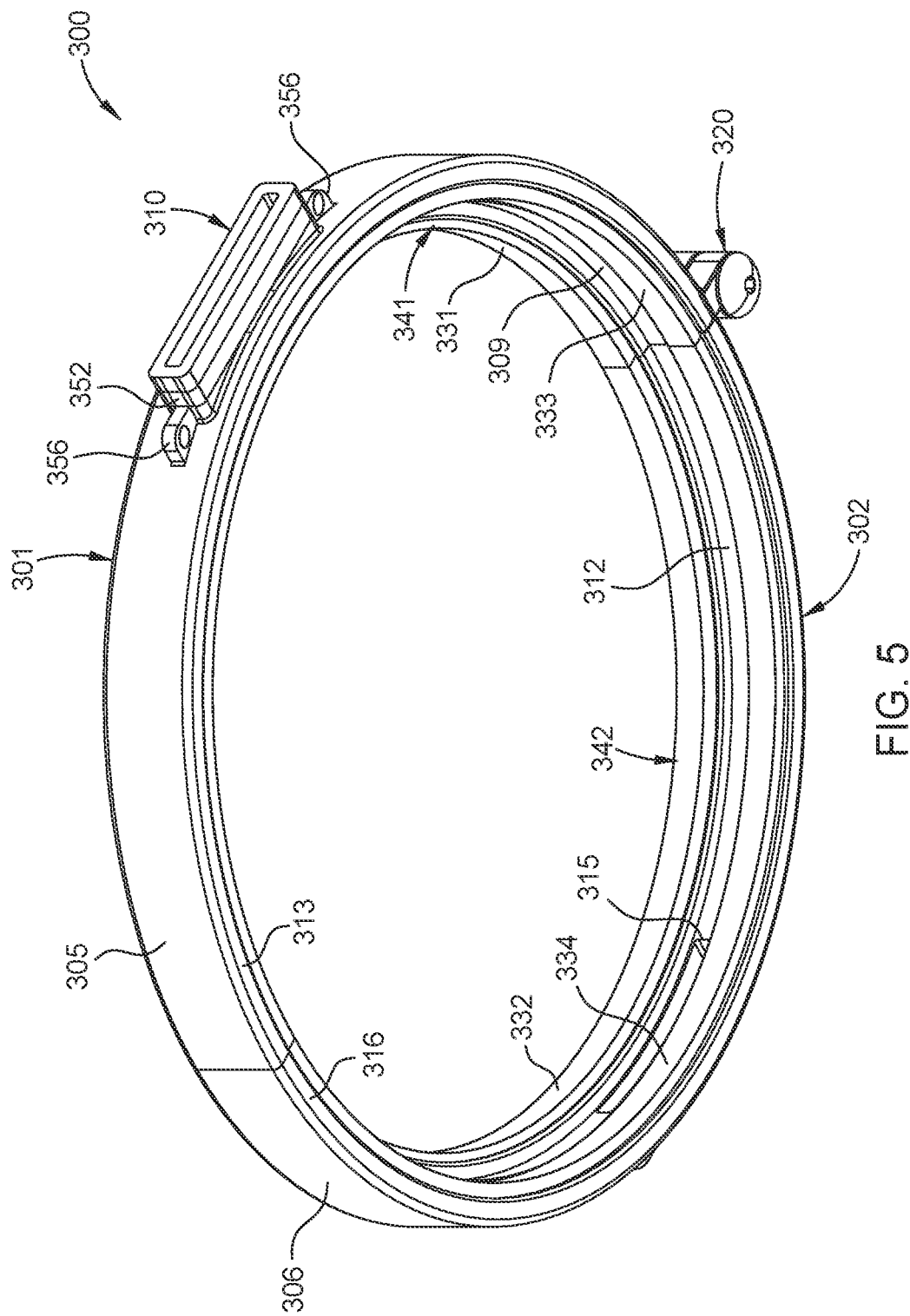
FIG. 5 is a bottom perspective view of the filter assembly illustrated in FIG. 4, according to one embodiment.
Figure 6:
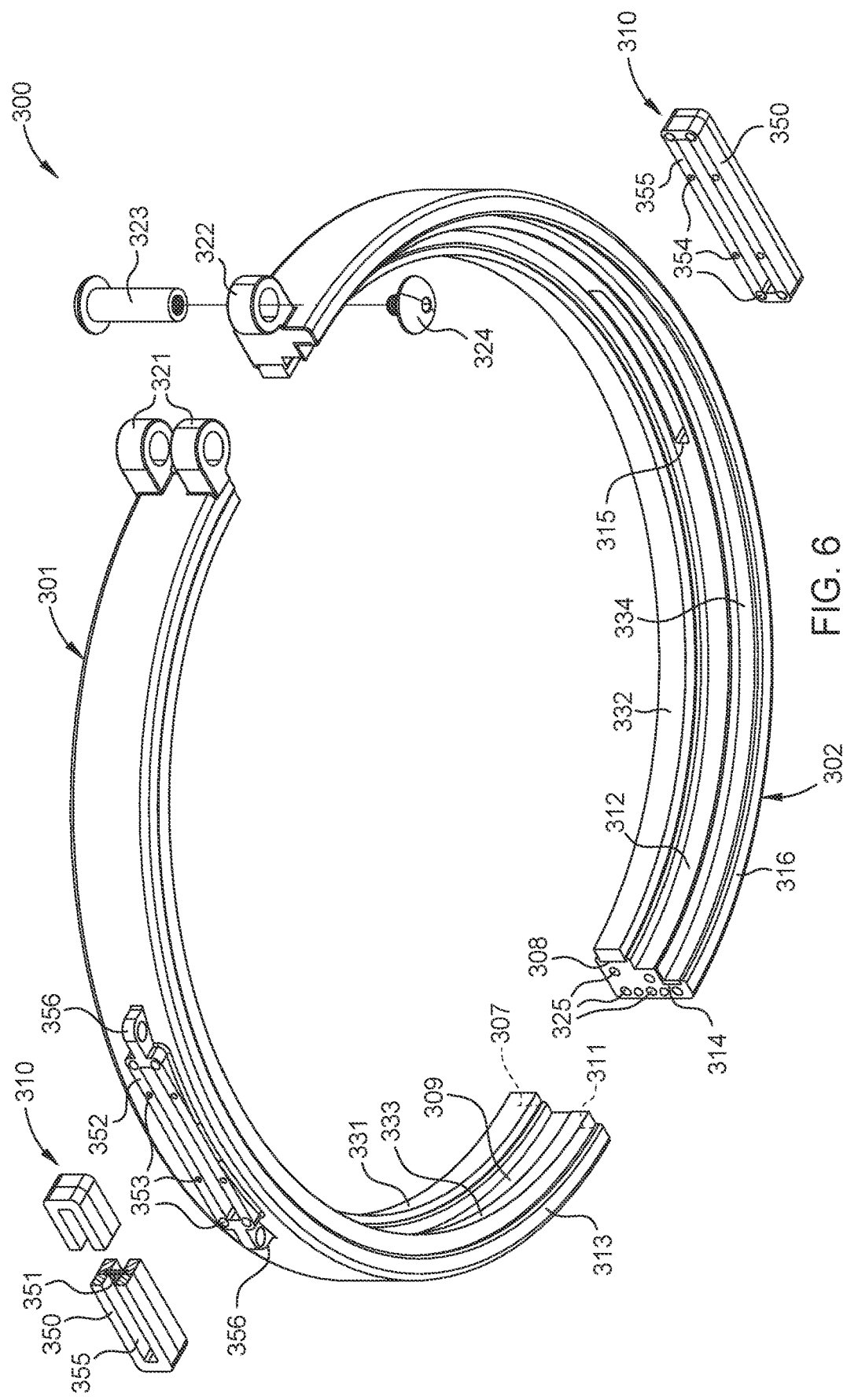
FIG. 6 is an exploded view of the filter assembly illustrated in FIGS. 4 and 5, according to one embodiment.

FIG. 4 is a top perspective view of the filter assembly 300, according to one embodiment. FIG. 5 is a bottom perspective view of the filter assembly 300 illustrated in FIG. 4, according to one embodiment. FIG. 6 is an exploded view of the filter assembly 300 illustrated in FIGS. 4 and 5, according to one embodiment.

With reference to FIGS. 4, 5, and 6, the filter assembly 300 comprises a hollow, circular body comprising a first body 301 coupled to a second body 302 via a hinged connection 320. The hinged connection 320 allows the first body 301 and the second body 302 to rotate relative to each other about the longitudinal axis of the hinged connection 320. Although only first and second bodies 301, 302 and a single hinged connection 320 are illustrated, the filter assembly 300 may be formed out of one, two, three, four, or more bodies and/or one, two, three, four, or more hinges to couple such bodies together.

The hinged connection 320 has a pin member 323 that extends through a pair of hinge support members 321 formed at one end of the first body 301, and that extends through a hinge support member 322 formed at one end of the second body 302. One or more of the hinge support members 321, 322 may be integrally formed with the first and second bodies 301, 302, or may be separate pieces that are connected to the first and second bodies 301, 302. The hinge support members 321, 322 are interleaved together to form a central bore through which the pin member 323 is inserted to rotatably interlock the first body 301 and the second body 322 together in the form of a hinge. A screw member 324 is threaded into one end of the pin member 323 to couple the pin member 323 to the hinge support members 321, 322. The first body 301 and the second body 302 can rotate relative to each other about the longitudinal axis of the pin member 323.

The first body 301 has a top surface 303, a bottom surface 313, and an outer surface 305 extending between the top and bottom surfaces 303, 313. An inner surface 341 of the first body 301 has three different inner diameters, specifically an upper inner diameter 307, a middle inner diameter 309, and a lower inner diameter 311. The upper inner diameter 307 is less than the middle inner diameter 309 and the lower inner diameter 311. The middle inner diameter 309 is less than the lower inner diameter 311.

The second body 302 has a top surface 304, a bottom surface 316, and an outer surface 306 extending between the top and bottom surfaces 304, 316. An inner surface 342 of the second body 302 has three different inner diameters, specifically an upper inner diameter 308, a middle inner diameter 312, and a lower inner diameter 314. The upper inner diameter 308 is less than the middle inner diameter 312 and the lower inner diameter 314. The middle inner diameter 312 is less than the lower inner diameter 314.

The upper inner diameters 307, 308 of the first and second bodies 301, 302 may be the same or different. The middle inner diameters 309, 312 of the first and second bodies 301, 302 may be the same or different. The lower inner diameters 311, 314 of the first and second bodies 301, 302 may be the same or different.

An upper sealing member 331 and a lower sealing member 333 are coupled to different portions of the inner surface 341 of the first body 301. The upper sealing member 331 is disposed on and coupled to the upper inner diameter 307 of the first body 301. The lower sealing member 333 is disposed on and coupled to the lower inner diameter 311 of the first body 301. Similarly, an upper sealing member 332 and a lower sealing member 334 are coupled to different portions of the inner surface 342 of the second body 302. The upper sealing member 332 is disposed on and coupled to the upper inner diameter 308 of the second body 302. The lower sealing member 334 is disposed on and coupled to the lower inner diameter 314 of the second body 302.

When the filter assembly 300 is installed, and the first and second bodies 301, 302 are secured together, the upper sealing members 331, 332 of the first and second bodies 301, 302 form a seal about the dispensing pipe 210 of the dosing device 200 (as illustrated in FIGS. 1-3). Also, the lower sealing members 333, 334 of the first and second bodies 301, 302 form a seal about the fill pipe 102 of the packaging system 100 (as illustrated in FIGS. 1-3). The upper sealing members 331, 332 may be formed out of materials including but not limited to silicone, silicone sponge, polytetrafluoroethylene (PTFE), ethylene propylene diene monomer rubber (EPDM), and/or ultra-high molecular weight polyethylene (UHMW). The lower sealing members 333, 334 may be formed out of materials including but not limited to silicone, silicone sponge, polytetrafluoroethylene (PTFE), ethylene propylene diene monomer rubber (EPDM), and/or ultra-high molecular weight polyethylene (UHMW).

The height of the upper sealing members 331, 332 may be the same as, less than, or greater than the height of the upper inner diameters 307, 308 of the first and second bodies 301, 302. The height of the upper sealing members 331, 332 and/or the height of the upper inner diameters 307, 308 may be within a range of 0 to 4 inches, or more. The height of the lower sealing members 333, 334 may be the same as, less than, or greater than the height of the lower inner diameters 311, 314 of the first and second bodies 301, 302. The height of the lower sealing members 333, 334 and/or the height of the lower inner diameters 311, 314 may be within a range of 0 to 4 inches, or more. The upper and/or lower sealing members 331, 332, 333, 334 may be any shape, such as rectangular, square, circular, L-shaped, U-shaped, etc.

The ends of the first and second bodies 301, 302 (opposite from the hinged connection 320) are coupled together by a releasable connection, such as by a magnetic coupling illustrated in FIG. 6 (and/or a latch 500 illustrated in FIGS. 7A and 7B further described below). One or more magnets 325 may be coupled to the ends of the first and second bodies 301, 302. The one or more magnets 325 may be disposed within corresponding support holes formed in the first and second bodies 301, 302 such that the magnets 325 are flush with the end faces of the first and second bodies 401, 402, respectively. The magnets 325 illustrated in FIG. 6 at the end of the second body 302 are similarly located at the end of the first body 301. The magnets 325 in the first body 301 are arranged to connect to the magnets 325 in the second body 302 to couple the first and second bodies 301, 302 together.

Any number, size, arrangement, and/or shape of magnets 325 may be used. The strength of the magnets 325 are configured to secure the filter assembly 300 to the dosing device 200 and/or the packaging system 100, and to prevent the filter assembly 300 from falling off of the dosing device 200 and/or the packaging system 100, during package forming processes. At the same time, the strength of the magnets 325 are configured to allow a worker to manually install and remove the filter assembly 300 to and from the dosing device 200 and/or the packaging system 100 with or without the use of any additional tools.

The filter assembly 300 can be manually secured to and removed from the bottom end of the dispensing pipe 210 of the dosing device 200 and the upper end of the fill pipe 102 of the packaging system 100 (as illustrated in FIGS. 1-3) by connecting and pulling apart the magnets 325. For example, the first and second bodies 301, 302 can be rotated via the hinged connection 320 about the dispensing pipe 210 and the fill pipe 102, and into contact with each other to connect the magnets 325 to each other, to manually attach the filter assembly 300. The upper sealing members 331, 332 form a seal about the dispensing pipe 210. The lower sealing members 333, 334 form a seal about the fill pipe 102.

The inner diameters 307, 309, 311 of the first body 301, the inner diameters 308, 312, 314 of the second body 302, the upper sealing members 331, 332, and/or the lower sealing members 333, 334 can be sized to fit a specific diameter size of the dispensing pipe 210 of the dosing device 200 and/or the fill pipe 102 of the packaging system 100. The inner diameters 307, 309, 311 of the first body 301, the inner diameters 308, 312, 314 of the second bod 302, the upper sealing members 331, 332, and/or the lower sealing members 333, 334 can be sized to fit dispensing pipes 210 having an outer diameter of 6 to 12 inches. The inner diameters 307, 309, 311 of the first body 301, the inner diameters 308, 312, 314 of the second bod 302, the upper sealing members 331, 332, and/or the lower sealing members 333, 334 can be sized to fit fill pipes 102 having an outer diameter of 6 to 12 inches.

The upper inner diameters 307, 308 and/or the upper sealing members 331, 332 of the first and second bodies 301, 302 can be sized to secure the filter assembly 300 about the outer diameter of the bottom end of the dispensing pipe 210 of the dosing device 200 (as illustrated in FIGS. 1-3). The upper inner diameters 307, 308 and/or the upper sealing members 331, 332 of the first and second bodies 301, 302 can be sized to form a sealed engagement about the outer diameter of the bottom end of the dispensing pipe 210 of the dosing device 200.

Similarly, the lower inner diameters 311, 314 and/or the lower sealing members 333, 334 of the first and second bodies 301, 302 can be sized to secure the filter assembly 300 about the outer diameter of the upper end of the fill pipe 102 of the packaging system 100 (as illustrated in FIGS.

1-3). The lower inner diameters 311, 314 and/or the lower sealing members 333, 334 of the first and second bodies 301, 302 can be sized to form a sealed engagement about the outer diameter of the upper end of the fill pipe 102 of the packaging system 100. The width or thickness of the upper and/or lower surfaces 303, 313, 304, 316, as well as the height of the outer surfaces 305, 306, of the first and second bodies 301, 302 can also be sized to help secure, such as seal, the filter assembly 300 to any type of dispensing pipe 210 of the dosing device 200 and/or fill pipe 102 of the packaging system 100.

Each of the first and second bodies 301, 302 include at least one filter support member 352, illustrated as a rectangular shaped rib, extending from the outer surfaces 305, 306. The filter support members 352 may be integrally formed with the first and second bodies 301, 302, or may be separate pieces that are coupled to the first and second bodies 301, 302. Each filter support member 352 is configured to support one or more filters 310.

Each filter support member 352 further comprises one or more connection members 356. One connection member 356 is shown on each side of the filter support members 352, although one, two, three, four, or more connection members 356 may be used. The connection members 356 can be used as anchor points to secure the filters 310 to the filter support member 352 via one or more ropes, such as wires or tethers.

The filters 310 are shown coupled to the filter support members 352 by a releasable connection, specifically by a magnetic coupling. For example, one or more magnets 353 may be coupled to the filter support member 352, which connect to one or more magnets 354 that are coupled to the filters 310. The one or more magnets 353 may be disposed within corresponding support holes formed in the filter support member 352 such that the magnets 353 are flush with the front face of the filter support member 352. Similarly, the one or more magnets 354 may be disposed within corresponding support holes formed in the filters 310 such that the magnets 354 are flush with the back face of the filter 310. The magnets 353 are arranged to connect to the magnets 354 to couple the filters 310 to the first and second bodies 301, 302. The magnets 353, 354 alone, the connection members 356 alone, or a combination of the magnets 353, 354 and the connection members 356 may be used to secure the filters 310 to the filter support members 352.

Any number, size, arrangement, and/or shape of magnets 353, 354 may be used. The strength of the magnets 353, 354 are configured to secure the filters 310 to the filter support members 352 of the first and second bodies 301, 302 to prevent the filters from falling off of the filter assembly 300 during package forming processes. At the same time, the strength of the magnets 353, 354 are configured to allow a worker to manually install and remove the filters 310 to and from the filter assembly 300 with or without the use of any additional tools.

Each of the first and second bodies 301, 302 further include at least one opening 315, illustrated as a rectangular shaped bore, that extends through the first and second bodies 301, 302 and through the filter support members 352. The openings 315 extend from the inner surfaces 341, 342, and specifically from the middle inner diameters 309, 312, to the outer surfaces 305, 306 and through the filter support members 352, respectively. Where the filter support members 352 are separate pieces coupled to the first and second bodies 301, 302, the filter support members 352 will have openings that similarly correspond to the openings 315. Any number, size, arrangement, and/or shape of filter support members 352 may be coupled to or formed integrally with the first and second bodies 301, 302. Any number, size, arrangement, and/or shape of openings 315 may be formed through the first and second bodies 301, 302.

Each filter 310 comprises a filter body 350 having an opening 355, illustrated as a rectangular shaped bore, with a filter medium 351 disposed in the opening 355. In FIG. 6, one filter body 350 is shown with a cross-sectional break to illustrate the filter medium 351 disposed within the opening 355 of the filter body 350. The filter medium 351 may be configured to prevent solids (or solids of a particular size) from flowing through the filter 310 while allowing fluid flow (such as gases, e.g. air and/or nitrogen) through the filter 310. The filter medium 351 may be a mesh having a mesh size within a range of 4×4 mesh to 80×80 mesh. For a 4×4 mesh, in one linear inch, there are four openings. The filter 310 and/or the filter medium 351 can be removed and cleaned, or replaced, when the filter 310 and/or the filter medium 451 become clogged, worn, damaged, and/or otherwise are not functioning properly.

The filters 310 are coupled to the filter support members 352 so that the openings 355 of the filter body 350 align with and/or are in fluid communication with the openings 315 of the first and second bodies 301, 302. The height and size of any one of the inner diameters 307, 309, 311, 308, 312, 314 and/or upper and lower sealing members 331, 332, 333, 334 of the first and second bodies 301, 302 can be sized to secure the filter assembly 300 to any type of dispensing pipe 210 of the dosing device 200 and/or any type of fill pipe 102 of the packaging system 100 such that flow through openings 315 and/or the filters 310 are not blocked by either the dispensing pipe 210 or the fill pipe 102. The upper sealing members 331, 332 are located above the openings 315 formed through the first and second bodies 301, 302. The lower sealing members 333, 334 are located below the openings 315 formed through the first and second bodies 301, 302. In this manner, the filter assembly 300 can prevent product or portions of the product from flowing out into the surrounding work environment during package forming processes.

Figure 7A:
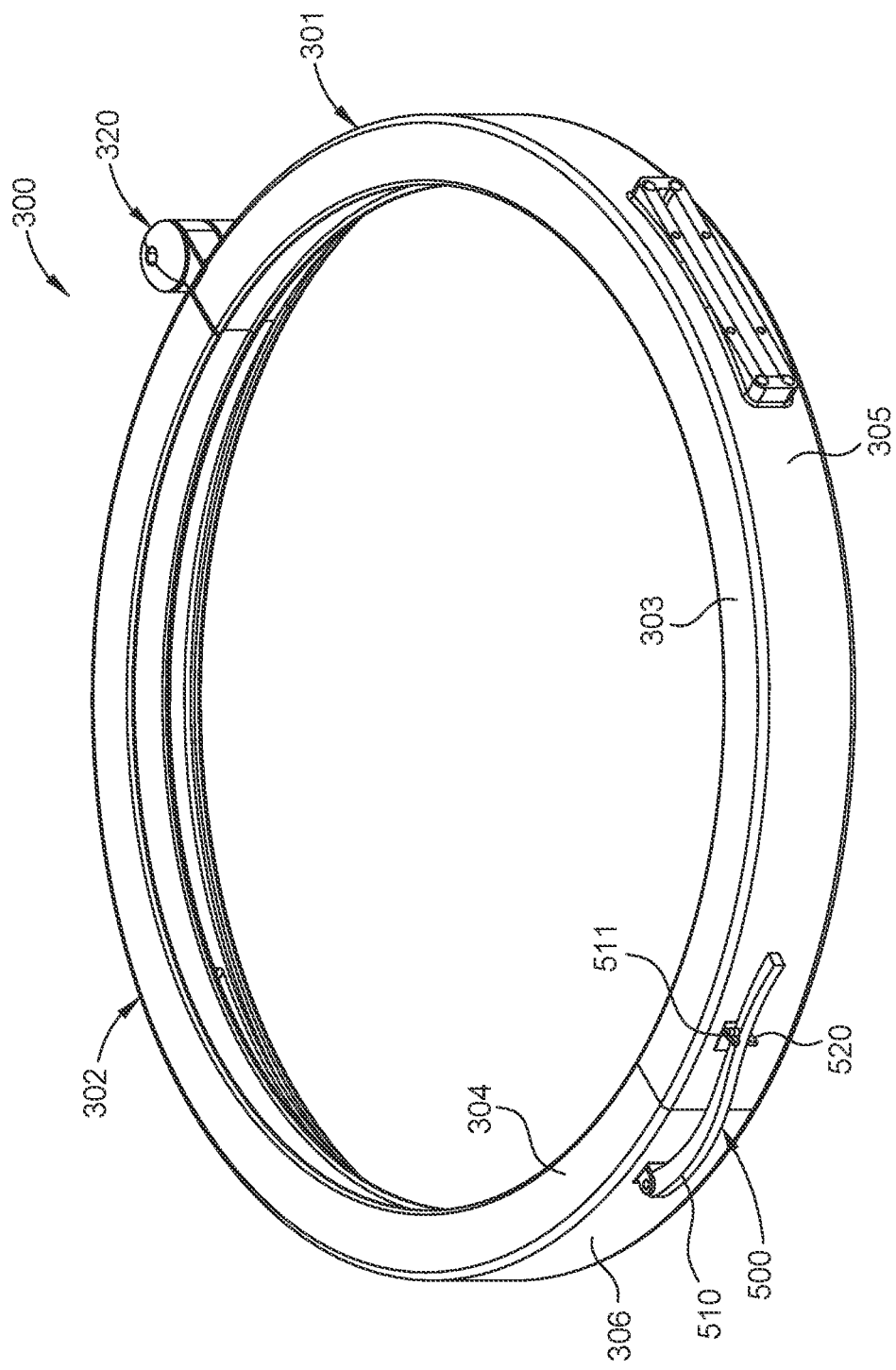
FIG. 7A is a top perspective view of a filter assembly with a latch in a closed and locked position, according to one embodiment.

FIG. 7A is a top perspective view of the filter assembly 300 with a latch 500 in a closed and locked position, according to one embodiment. FIG. 7B is a top perspective view of the filter assembly 300 with the latch 500 in an open and unlocked position, according to one embodiment. Some of the features of the filter assembly 300 illustrated in FIGS. 4-6 have been removed from FIGS. 7A and 7B to clearly illustrate the latch 500.

The latch 500 may be used in addition to or as an alternative to the magnets 325 (illustrated in FIGS. 6) to releasably couple the ends of the first and second bodies 301, 302 (opposite from the hinged connection 320) together. The latch 500 comprises a latch arm 510 having a locking member 511, and a latch receiver 520. One or more latches 500 may be coupled to the ends of the first and second bodies 301, 302. The latch arm 510 may be coupled to the outer surface 306 of the second body 302, and the latch receiver 520 may be coupled to the outer surface 305 of the first body 301, or vice versa. The latch 500 may be coupled to the top surfaces 303, 304 (and/or even the bottom surfaces) of the first and second bodies 301, 302.

The latch arm 510 is pivotably coupled to the second body 302 to allow the latch arm 510 to be manually moved into engagement with the latch receiver 520. The latch arm 510 itself may be configured to lock into the latch receiver 520 when moved into engagement, such as by an interference fit, and/or the locking member 511 may lock the latch arm 510 into engagement with the latch receiver 520 to couple the first and second bodies 301, 302 together. Any number, size, arrangement, and/or shape of latches 500 may be used.

The strength of the latch 500 when in the closed and locked position is configured to secure the filter assembly 300 to the dosing device 200 and/or the packaging system 100, and to prevent the filter assembly 300 from falling off of the dosing device 200 and/or the packaging system 100, during package forming processes. At the same time, the strength of the latch 500 is configured to allow a worker to manually install and remove the filter assembly 300 to and from the dosing device 200 and/or the packaging system 100 with or without the use of any additional tools. The latch 500 shown in FIGS. 7A and 7B is illustrative of one embodiment, however, the latch 500 may comprise numerous other variations of latches to secure the filter assembly 300 in a closed and locked position.

The filter assembly 300 can be manually secured to and removed from the bottom end of the dispensing pipe 210 of the dosing device 200 and the upper end of the fill pipe 102 of the packaging system 100 (as illustrated in FIGS. 1-3) by connecting and disconnecting the latch 500. For example, the first and second bodies 301, 302 can be rotated via the hinged connection 320 about the dispensing pipe 210 and the fill pipe 102, and into contact with each other. Then the latch arm 510 may be rotated into engagement with the latch arm receiver 520 such that the locking member 511 locks into the latch arm 510 to the latch receiver 520 to manually attach the filter assembly 300. To remove and/or move the filter assembly 300 to the open and unlocked position, the latch arm 510 and/or the locking member 511 can be manually moved out of engagement with the latch receiver 520. Then the ends of the first and second bodies 301, 301 can be rotated via the hinged connection 320 apart from each other.

Figure 8:
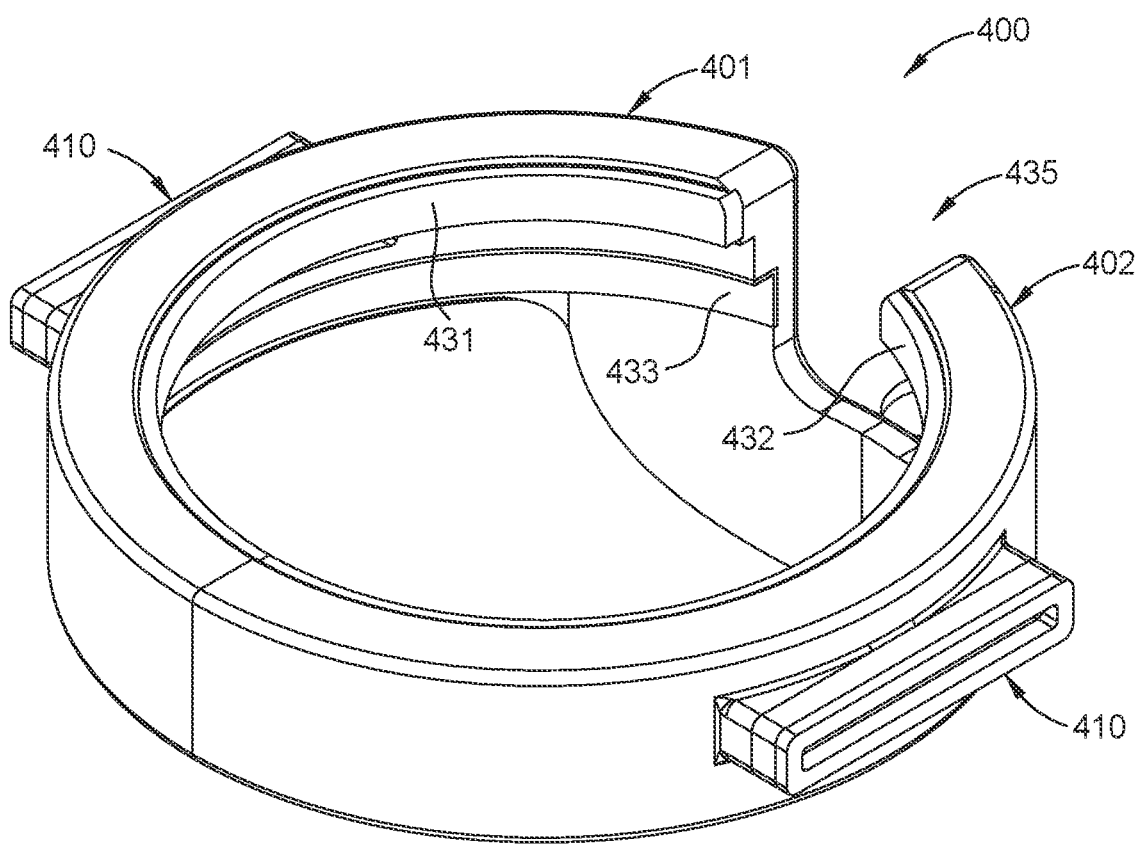
FIG. 8 is a top perspective view of a filter assembly, according to one embodiment.
Figure 9:
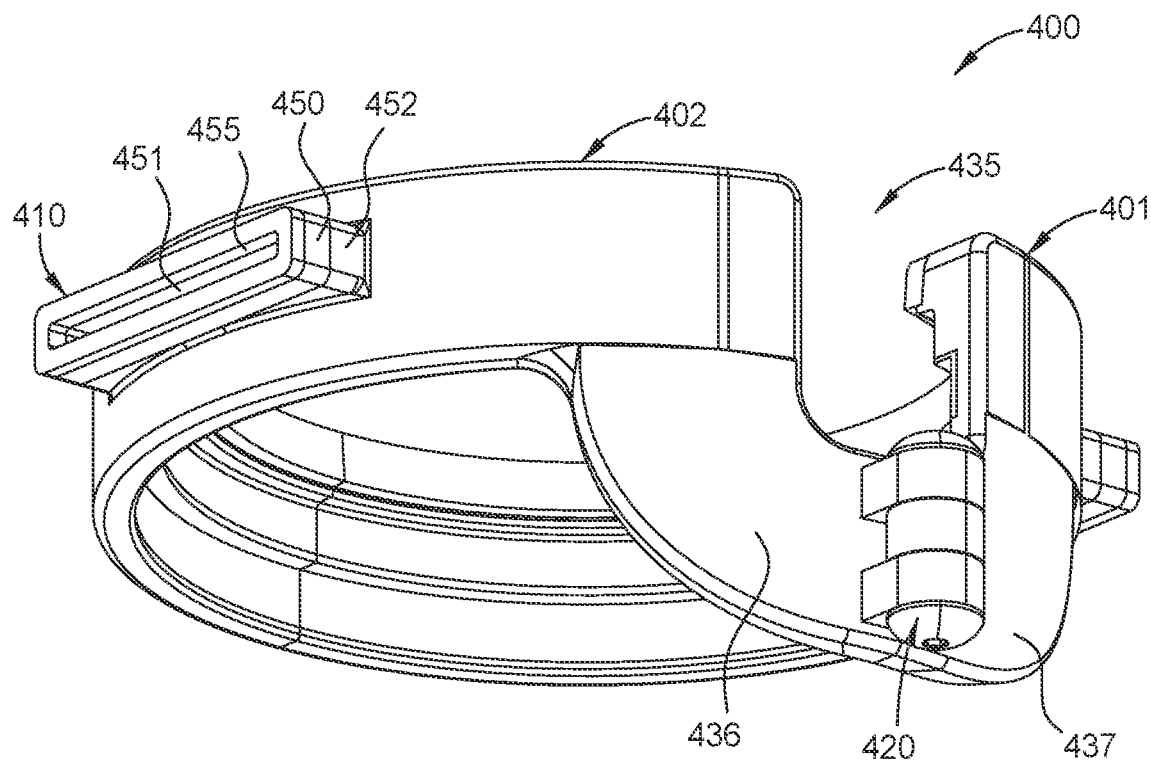
FIG. 9 is a bottom perspective view of the filter assembly illustrated in FIG. 8, according to one embodiment.
Figure 10:
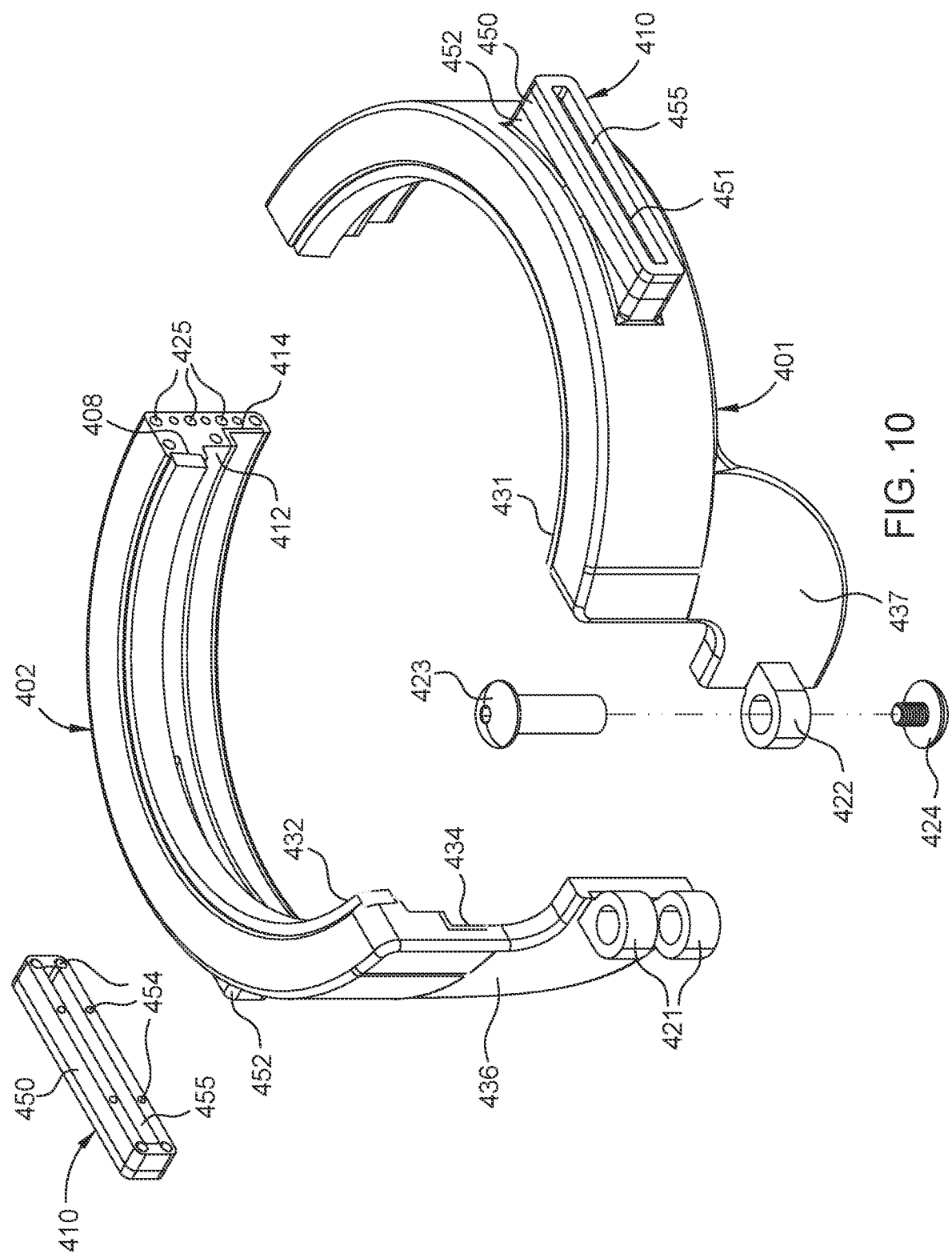
FIG. 10 is an exploded top view of the filter assembly illustrated in FIGS. 8 and 9, according to one embodiment.
Figure 11:
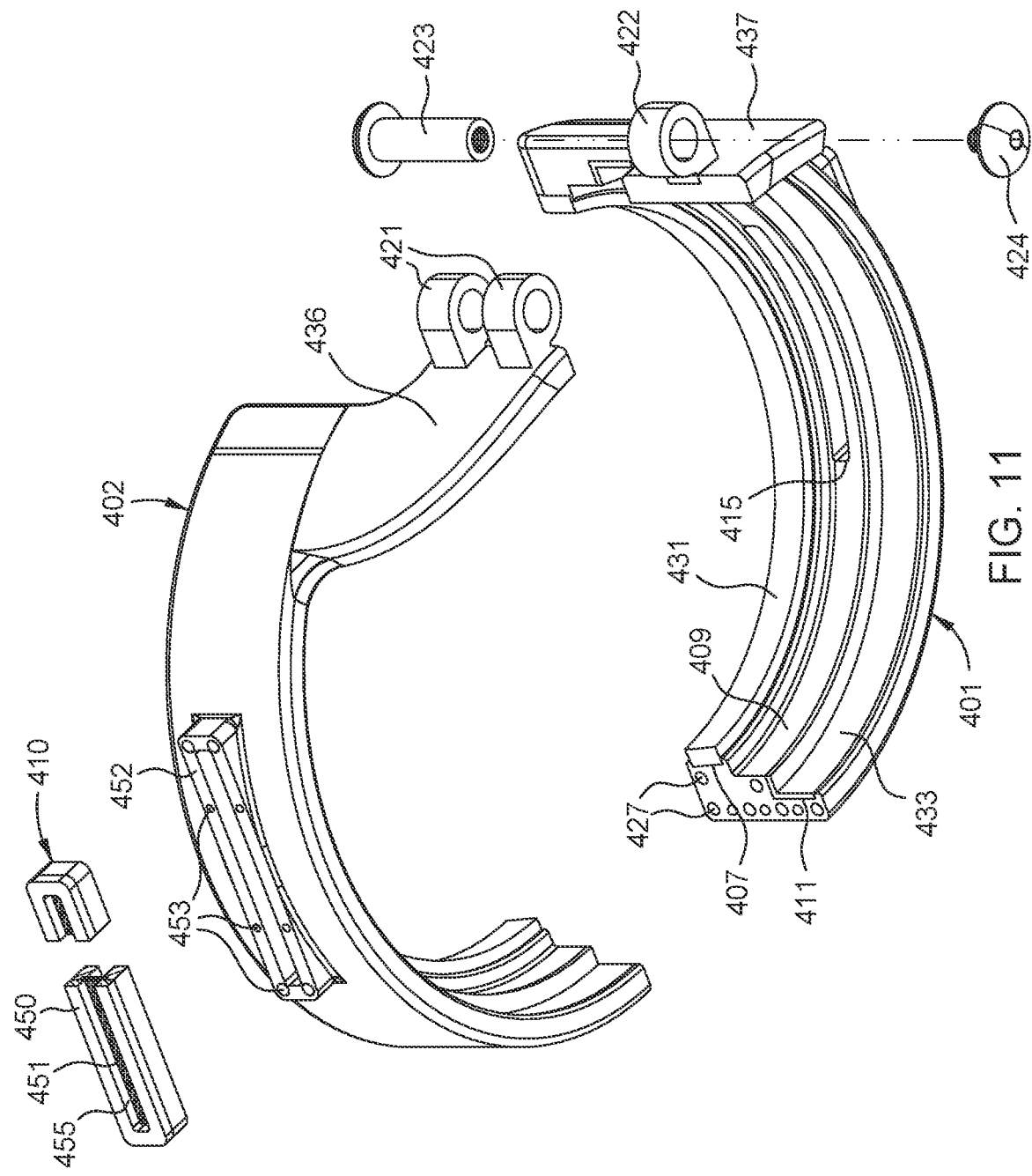
FIG. 11 is an exploded bottom view of the filter assembly illustrated in FIGS. 8, 9, and 10, according to one embodiment.

FIG. 8 is a top perspective view of a filter assembly 400, according to one embodiment. FIG. 9 is a bottom perspective view of the filter assembly 400 illustrated in FIG. 8, according to one embodiment. FIG. 10 is an exploded top view of the filter assembly 400 illustrated in FIGS. 8 and 9, according to one embodiment. FIG. 11 is an exploded bottom view of the filter assembly 400 illustrated in FIGS. 8, 9, and 10, according to one embodiment.

The filter assembly 400 is substantially similar to the filter assembly 300. Components of the filter assembly 400 that are similar to components of the filter assembly 300 have the same ending reference number but with a 400-series reference number designation. A full description of similar components between the filter assemblies 300, 400 will not be repeated.

With reference to FIGS. 8, 9, 10, and 11, the filter assembly 400 includes first and second bodies 401, 402 that are rotatable relative to each other via the hinged connection 420 and into engagement with each other via a releasable connection, such as by a magnetic coupling. For example, the one or more magnets 425, 427 may be coupled to the ends of the first and second bodies 401, 402 (opposite the hinged connection 420). The one or more magnets 425, 427 may be disposed within corresponding support holes formed in the first and second bodies 401, 402 such that the magnets 425, 427 are flush with the end faces of the first and second bodies 401, 402, respectively. The magnets 427 in the first body 401 are arranged to connect to the magnets 425 in the second body 402 to couple the first and second bodies 401, 402 together.

The filter assembly 400 similarly includes upper and lower sealing members 431, 432, 433, 434 in the same manner as the filter assembly 300 to form a seal against the dispensing pipe 210 of the dosing device 200 and the fill pipe 102 of the packaging system 100. For example, the upper sealing members 431, 432 may be disposed on the upper inner diameters 407, 408, respectively, of the first and second bodies 401, 402 of the filter assembly 400. For example, the lower sealing members 433, 434 may be disposed on the lower inner diameters 411, 414, respectively, of the first and second bodies 401, 402 of the filter assembly 400.

The filter assembly 400 differs from the filter assembly 300 in that the first and second bodies 401, 402 of the filter assembly 400 each have elongated portions 437, 436, respectively that together form an empty space 435, such as a dip, in the outer circumference of the filter assembly 400. The empty space 435 is provided to accommodate for dispensing pipes (such as dispensing pipe 210) that may have extension portions or other components located at the bottom end of the dispensing pipes. The elongated portions 437, 436 are illustrated as having curved J-shaped portions that extend from the bottom surfaces 413, 413 of the first and second bodies 401, 402. The empty space 435 is located above the elongated portions 437, 436 when coupled together. The elongated portions 436, 437 also support the hinged connection 420, similar to the hinged connection 320, which allows the first and second bodies 401, 402 to rotate relative to each other about the longitudinal axis of the hinged connection 420. In this manner, the filter assembly 400 can be secured to the bottom end of various types of dispensing pipes without interference with such extension portions or other components.

When installed, the filter assembly 400 prevents product or portions of product from flowing out into the surrounding work environment during package forming processes. The filter assembly 400 can be installed and removed manually with or without the use of additional tools. The filters 410 can be removed and cleaned, or replaced, when the filter medium 451 becomes clogged, worn, or damaged. In this manner, the filter assembly 400 is configured to help contain product flow for various types and sizes of dispensing pipes of dosing devices and/or fill pipes of packaging systems.

The present disclosure contemplates that terms such as "couples," "coupling," "couple," and "coupled" may include welding, interference fitting, and/or fastening such as by using adhesives, bolts, threaded connections, and/or screws. The present disclosure contemplates that terms such as "couples," "coupling," "couple," and "coupled" may include direct coupling and/or indirect coupling. The present disclosure contemplates a variety of sizes and/or scaling can be used for the embodiments described herein.

Any of the embodiments recited above may be combined, in whole or part, with any of the other embodiments recited above. It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements.

While the foregoing is directed to embodiments of the present disclosure, other and further embodiments of the disclosure may be devised without departing from the basic scope thereof, and the scope thereof is determined by the claims that follow.

We claim:

1. An assembly, comprising:
a first body, wherein the first body has an inner surface comprising an upper inner diameter, a middle inner diameter, and a lower inner diameter, wherein the upper and middle inner diameters are less than the lower inner diameter, and wherein the upper inner diameter is different than the middle inner diameter;
a second body, wherein the second body has an inner surface comprising an upper inner diameter, a middle inner diameter, and a lower inner diameter, wherein the upper and middle inner diameters are less than the lower inner diameter, and wherein the upper inner diameter is different than the middle inner diameter;
upper sealing members coupled to the upper inner diameters of the first and second bodies:
lower sealing members coupled to the lower inner diameters of the first and second bodies;
a hinged connection rotatably coupling the first and second bodies together; and
a releasable connection releasably coupling the first and second bodies together.

2. The assembly of claim 1, further comprising a filter coupled to the first body that is in fluid communication with an opening formed through a sidewall of the first body, wherein the filter is configured to prevent solids from flowing through the filter while allowing fluid flow through the filter.

3. The assembly of claim 2, wherein the filter comprises a filter body having a filter opening formed through the filter body with a filter medium disposed in the filter opening, and wherein the filter opening at least partially aligns with the opening of the first body when the filter is coupled to the first body.

4. The assembly of claim 1, wherein hinged support members coupled to one end of the first and second bodies are interleaved together to form a central bore, and wherein a pin member is disposed in the central bore to form the hinged connection.

5. The assembly of claim 4, wherein the releasable connection is coupled to the opposite end of the first and second bodies and comprises at least one of a magnetic coupling and a latch.

6. The assembly of claim 3, wherein the filter is coupled to a filter support member of the first body via a second releasable connection.

7. The assembly of claim 6, wherein the second releasable connection comprises a magnetic coupling.

8. The assembly of claim 3, wherein the filter is releasably coupled to the first body by a magnetic coupling, and further comprising an opening formed through a sidewall of the second body, and a second filter coupled to the second body by a magnetic coupling and that is in fluid communication with the opening formed through the second body.

9. The assembly of claim 1, wherein the first and second bodies when coupled together comprise elongated portions that form an empty space in an outer circumference of the assembly.

10. The assembly of claim 1, wherein a height of the upper sealing members is the same as a height of the upper inner diameters of the first and second bodies.

11. An assembly, comprising:
a first body, wherein the first body has an inner surface comprising an upper inner diameter, a middle inner diameter, and a lower inner diameter, wherein the upper and middle inner diameters are less than the lower inner diameter, and wherein the upper inner diameter is different than the middle inner diameter;
a second body rotatably coupled to the first body, wherein the second body has an inner surface comprising an upper inner diameter, a middle inner diameter, and a lower inner diameter, wherein the upper and middle inner diameters are less than the lower inner diameter, and wherein the upper inner diameter is different than the middle inner diameter;
upper sealing members coupled to the upper inner diameters of the first and second bodies;
lower sealing members coupled to the lower inner diameters of the first and second bodies; and
a releasable connection releasably coupling one end the first body to one end of the second body.

12. The assembly of claim 11, further comprising a hinged connection rotatably coupling the first and second bodies together.

13. The assembly of claim 12, wherein hinged support members coupled to one end of the first and second bodies are interleaved together to form a central bore, and wherein a pin member is disposed in the central bore to form the hinged connection.

14. The assembly of claim 13, wherein the releasable connection is coupled to the opposite end of the first and second bodies from the hinged connection and comprises a magnetic coupling.

15. The assembly of claim 14, wherein the magnetic coupling comprises one or more magnets disposed within support holes formed in the first and second bodies such that the magnets are flush with end faces of the first and second bodies.

16. The assembly of claim 13, wherein the releasable connection is coupled to the opposite end of the first and second bodies from the hinged connection and comprises a latch.

17. The assembly of claim 16, wherein the latch comprises a latch arm configured to engage a latch receiver to lock the first and second bodies together.

18. The assembly of claim 11, further comprising a filter coupled to the first body that is in fluid communication with an opening formed through a sidewall of the first body, wherein the filter is configured to prevent solids from flowing through the filter while allowing fluid flow through the filter, wherein the filter comprises a filter body having a filter opening formed through the filter body with a filter medium disposed in the filter opening, wherein the filter opening at least partially aligns with the opening formed through the sidewall of the first body when the filter is coupled to the first body, and wherein the filter is coupled to the first body via a first releasable connection.

19. The assembly of claim 18, further comprising a second opening formed through a sidewall of the second body, and a second filter coupled to the second body via a second releasable connection such that the second filter is in fluid communication with the second opening formed through the sidewall of the second body, and wherein the second filter is configured to prevent solids from flowing through the second filter while allowing fluid flow through the second filter.

20. The assembly of claim 19, wherein the first and second releasable connections comprise magnetic couplings.

* * * * *